United States Patent [19]

Bracken et al.

[11] Patent Number: 4,583,213

[45] Date of Patent: Apr. 15, 1986

[54] AIR SHROUD FOR DATA STORAGE DISKS

[75] Inventors: Allen T. Bracken; Harold A. Lunka, both of Boulder; William J. Benker, Adams; Howard A. Snyder; Gary W. Collins, both of Boulder, all of Colo.

[73] Assignee: Storage Technology Partners II, Louisville, Colo.

[21] Appl. No.: 628,198

[22] Filed: Jul. 6, 1984

[51] Int. Cl.⁴ .................... G11B 25/04; G11B 23/02
[52] U.S. Cl. .................................. 369/261; 360/99; 360/133; 369/258
[58] Field of Search ............... 369/261, 258; 360/97, 360/99, 133

[56] References Cited

U.S. PATENT DOCUMENTS

| | | | |
|---|---|---|---|
| 3,740,735 | 6/1973 | Gabor | 360/97 |
| 4,002,826 | 1/1977 | Iemenschot | 369/261 |
| 4,068,851 | 1/1978 | Yamamura | 369/261 |
| 4,308,041 | 12/1981 | Ellis et al. | 360/97 |
| 4,381,528 | 4/1983 | Fujioka | 360/97 |

Primary Examiner—Steven L. Stephan

[57] ABSTRACT

An air shroud is disclosed for reducing vibration of the disk storage medium and controlling contamination in the environment above the disk in an optical disk data recording system. The shroud is placed over the rotating disk and pressurized air is forced into the center of the air space between the shroud and the disk where it moves from the center to the outside edge in a laminar flow. The shroud includes a circular plate with a slot for allowing the laser read/write beam to shine through the shroud and contact the surface of the disk for reading and writing data on the disk. An air duct is mounted around a center hole of the circular plate to distribute the pressurized air into the air space and a flange is mounted on the outer edge of the circular plate to reduce turbulence in the air flowing across the disk.

12 Claims, 5 Drawing Figures

AIR SHROUD FOR DATA STORAGE DISKS

BACKGROUND OF THE INVENTION

This invention relates to disk data storage systems and more particularly to apparatus for reducing contamination and vibration of the disk data storage medium used in an optical disk data storage device. Even more particularly, this invention relates to placing a shroud over the disk data storage medium to reduce contamination and to reduce air turbulence and therefore reduce vibration caused by such turbulence.

Optical disk data storage devices employ a laser light source to write and read data on the surface of an optical disk storage medium. When writing at high densities, the laser must be very finely focused on the disk surface. This focusing requires a movable focusing element, such as a lens, near the surface of the disk, and the distance between the focusing element and the surface of the disk must remain constant. The focusing element is contained in a read/write head and is movable so that it can refocus the laser beam if this distance changes. However, a very rapid change in the distance between the focusing element and the disk surface, such as that caused by vibration of the disk surface, cannot be corrected to keep the laser beam finely focused. Therefore, vibration of the disk results in a wider focus point and therefore a wider track made by the beam as the disk rotates underneath it. Reducing disk vibration results in a more narrow focus point, and a narrower track width; therefore, more tracks can be stored on the surface of the disk storage medium.

One cause of vibration of the disk is air turbulence over the surface as the disk rotates. Any rotating disk acts as a natural pump to move air from the inner diameter of the disk to the outer diameter. If the disk surface is exposed to ambient air, air currents caused by any obstruction near the disk, such as the read/write head, will cause turbulence of the air near the surface and such turbulence causes the disk to vibrate. Vibration results in a wider focus point and places a drag on the rotation of the disk. Reducing the turbulence reduces vibration of the disk thus decreasing track width to allow more data storage on a disk, and thus decreasing drag to lower the energy required for rotation of the disk.

Another problem in disk data storage devices is contamination by small particles of dirt or other foreign material on the surface of the disk. Since an optical read/write head in an optical disk storage device is located farther from the disk surface than a magnetic read/write head in a magnetic disk storage device, optical devices are less sensitive to contamination, however, care must still be taken to reduce such contamination. One way to reduce this contamination is to provide a positive air pressure over the disk surface using filtered, uncontaminated air. However, this positive air pressure implies a larger flow rate which increases the chance for turbulent flow across the disk.

It is thus apparent that there is a need in the art for a device to reduce the turbulent caused vibration of a disk storage medium as it rotates underneath a read/write head. There is also a need to provide a positive air pressure over the disk storage medium using filtered air to prevent contamination as would be caused by ambient, unfiltered air near the surface of the disk. The air shroud disclosed herein is directed to satisfying these and other needs.

SUMMARY OF THE INVENTION

It is an object of the present invention to provide apparatus for reducing the vibration of the disk storage medium in an optical disk storage device.

It is also an object of the present invention to provide such apparatus to create a positive air pressure over the surface of the disk storage medium.

It is a further object of the present invention to provide such apparatus that reduces the turbulence of airflow over the disk.

The above and other objects of the present invention are realized through the use of an air shroud that comprises a circular plate with a center hole. A spindle for rotating the disk passes through the center hole. A slot in the plate running from the outside edge of the plate towards the center allows the laser beam unrestricted travel from the light source located above the plate to the disk storage medium underneath the plate and allows the laser beam focusing element to be located very close to the surface of the disk. An air duct with an air inlet opening for admitting pressurized air is attached to the top of the plate around the edge of the center hole. The duct runs approximately three quarters of the way around the circumference of the center hole and has small holes in its base to allow pressurized air to flow from the duct, through the plate, to the space between the plate and the disk. This pressurized air then flows radially across the disk and exits into the surrounding air. To prevent turbulence across the disk surface due to high flow rates, a flange is attached to the edge of the plate to build up back pressure and reduce air flow. The buildup of pressure at the edge utilizes the pumping action of the opposite surface of the disk. Space is also provided by the flange for any vortex created by the air leaving the edge of the plate. The flange curves upward then downward to allow space for the vortex and therefore create a smooth flow of air from the pressurized space between the plate and disk into the surrounding ambient pressure air space. The distance between the plate and the disk, the flange, and the pressure of the air combine to provide a smooth laminar flow of air from the duct holes located at the edge of the center hole to the outside edge of the plate and disk. The air pressure also prevents ambient air, potentially containing contaminants, from entering the space between the disk and the plate.

The invention also provides a method of reducing vibration of a disk storage medium by placing a circular plate closely parallel to the disk and supplying pressurized air to the space between the disk and the plate. The air pressure and the distance between the plate and the disk combine to provide a smooth laminar flow of air across the surface of the disk.

BRIEF DESCRIPTION OF THE DRAWINGS

The above and other objects, features, and advantages of the present invention will be more apparent from the following description of the preferred embodiment presented in connection with the following drawings, wherein.

DESCRIPTION OF THE PREFERRED EMBODIMENT

The following is a description of the best presently contemplated mode of carrying out the present invention. This description is given only to illustrate the general principles of the invention and is not to be taken in a limiting sense. The true scope of the invention can be ascertained by reading the appended claims.

Figure 1:
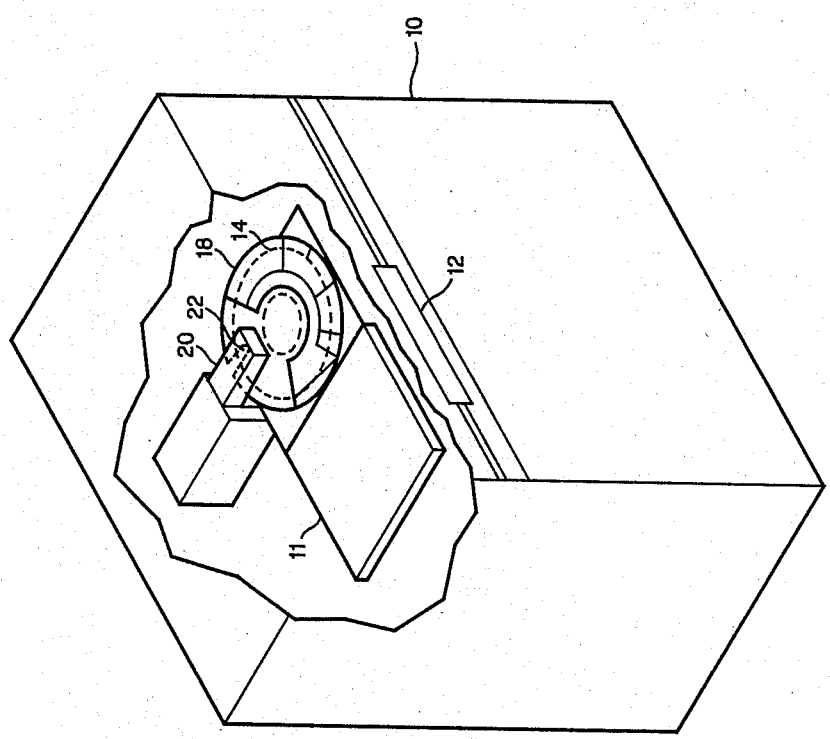
FIG. 1 depicts the environment in which the air shroud of the present invention is typically used.

FIG. 1 is a perspective view of an optical disk data storage device 10. An opening 12 is used for insertion of a cartridge 11 containing a disk storage medium 14. The cartridge 11 is opened and the medium 14 is raised by an elevator mechanism (not shown) to a position underneath an air shroud 18. A read/write head 20 is positioned over a slot 22 in the air shroud 18 such that a laser light beam (not shown) shines from the read/write head 20 through the slot 22 onto the disk storage medium 14.

Figure 2:
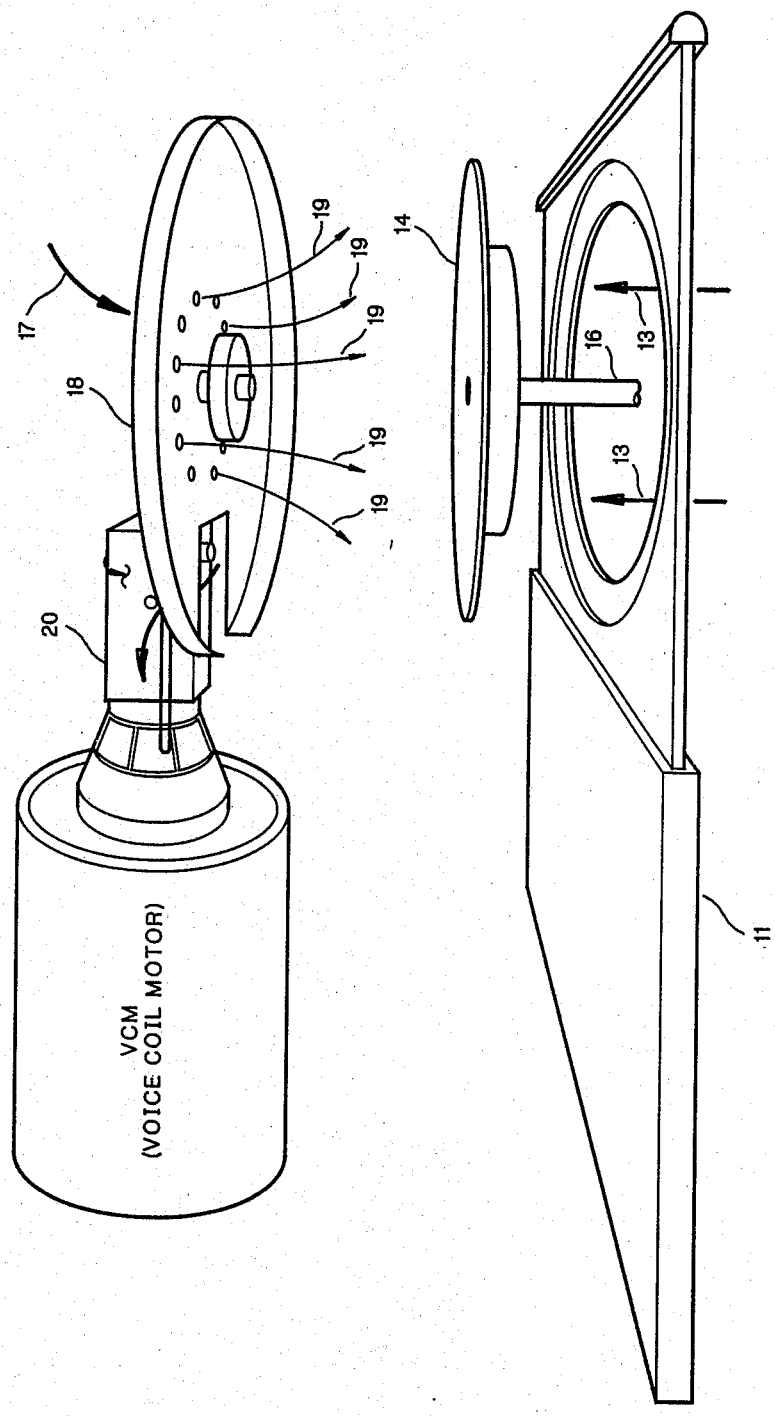
FIG. 2 shows the disk storage medium being placed under the shroud.

FIG. 2 shows the disk storage medium being placed under the air shroud. After being inserted in the slot 12 (shown in FIG. 1), the cartridge 11 is opened and the disk 14 is raised in the direction indicated by arrows 13 by an elevator mechanism 16 to a position under the air shroud 18. Pressurized air flows into the air shroud in the direction indicated by the arrow 17, and out of the air shroud as indicated by the arrows 19.

Figure 3:
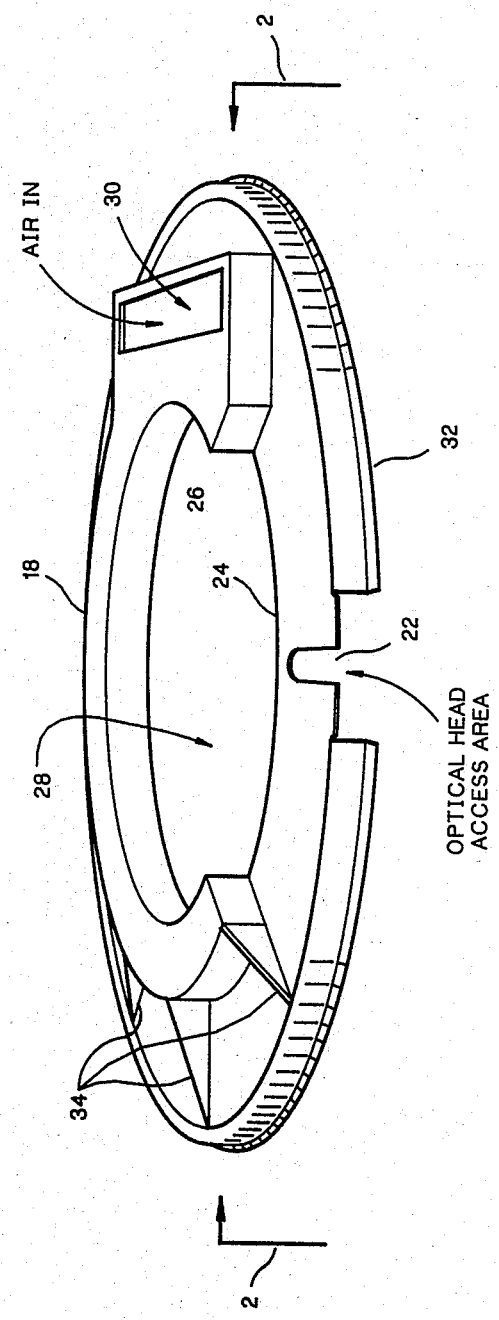
FIG. 3 is a top perspective view of the air shroud.

FIG. 3 is a top perspective view of the air shroud 18. A circular plate 24 contains a slot 22 to allow a laser light beam (not shown) to shine through the circular plate 24 and to allow the read/write head 20 to be located very close to the disk storage medium 14. An air duct 26 is attached to the circular plate 24 around the rim of a center hole 28 located in the circular plate 24. An air inlet opening 30 admits pressurized air into the air duct 26 and the air leaves the air duct 26 through a set of holes (not shown FIG. 3) located in the bottom of the duct and in the circular plate 24. A flange 32 is attached to the outer edge of the circular plate 24 to provide for the buildup of pressure and therefore reduce turbulence in the pressurized air flow across the circular plate 24. The air duct 26 extends approximately three quarters of the way (270 degrees) around the rim of the center hole 28, but does not cover the area of the circular plate 24 near the slot 22. Ribs 34 help to make the overall structure more rigid.

Figure 4:
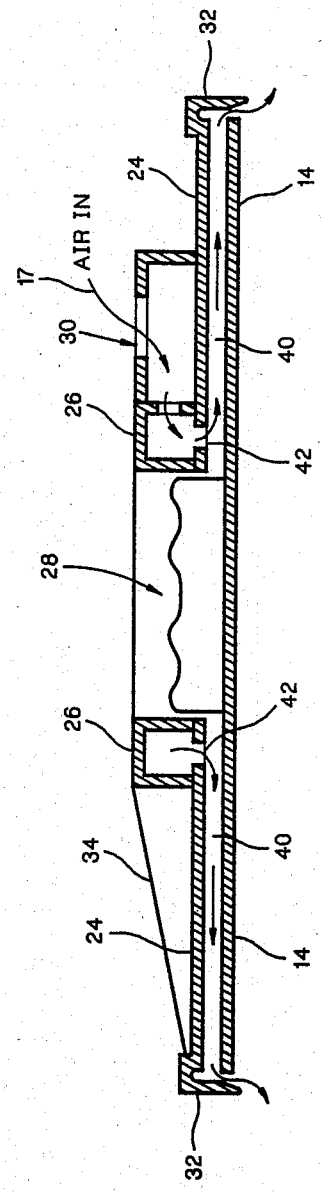
FIG. 4 is a cross-section side view of the air shroud taken substantially through lines 2—2 of FIG. 2.

Referring now to FIG. 4, a cross-section side view of the air shroud 18 taken substantially through lines 2—2 of FIG. 3 is shown. The circular plate 24 is mounted parallel and in close proximity to a disk storage medium 14 to form an air space 40. The distance between the circular plate 24 and the disk storage medium 14 in combination with other parameters is small enough to cause air flow therebetween to be substantially laminar. In the preferred embodiment, this distance is in the range of 0.060-inch to 0.080-inch and the airflow is in the range of 15 cubic feet per minute to 20 cubic feet per minute with a 14 inch diameter disk rotating at approximately twenty two revolutions per second. The air duct 26, attached to the circular plate 24, has an air inlet opening 30 to admit pressurized air. The pressurized air flows in the direction of arrow 17 through the air duct 26, out through holes 42 located in the bottom of the air duct 26 and the circular plate 24, and through the air space 40, exiting into the surrounding air as it passes the flange 32. The flange 32, attached to the circular plate 24, reduces turbulence of the air flow in the air space 40 as the air leaves the air space 40 and passes into the surrounding unpressurized air by providing space for any vortex occurring in the pressurized air as it leaves the air space 40. Having pressurized air feeding into the air space 40 prevents the natural pumping action of the rotating disk storage medium 14 from forcing air outward to create a partial vacuum in the air space 40 which would pull surrounding air, that might be contaminated, into the air space 40 through the center hole 28.

Figure 5:
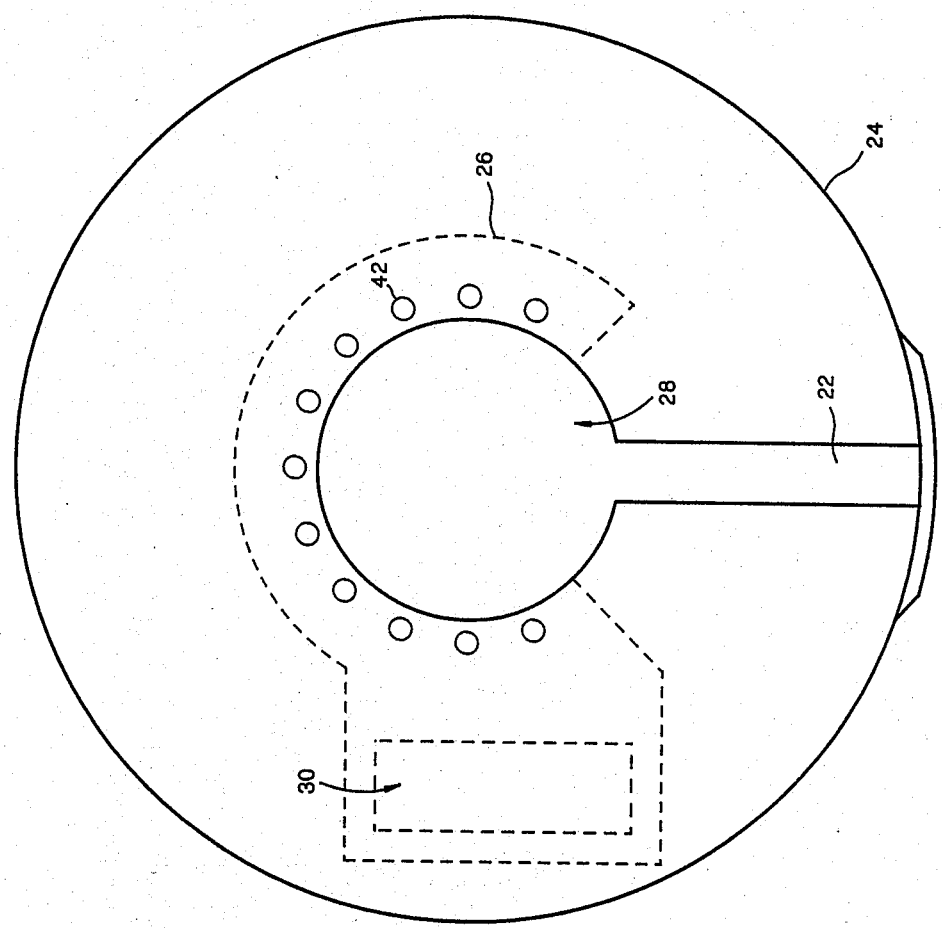
FIG. 5 is a bottom view of the air shroud.

FIG. 5 is a bottom view of the air shroud 18. The slot 22 extends inward from the outer edge of the circular plate 24. The air duct 26 extends approximately 270 degrees around the rim of the center hole 28, and contains the air inlet hole 30 and air exit holes 42.

In the preferred embodiment, the air shroud is made of aluminum, with the circular plate, the air duct and flange being made separately and then assembled together. In another embodiment, all these parts could be cast into a single unit of aluminum.

While the invention herein disclosed has been described by means of a specific embodiment and application thereof, numerous modifications, and variations could be made thereto by those skilled in the art without departing from the spirit and scope of the present invention. Those skilled in the art will recognize that the invention herein is applicable to magnetic disk data storage devices as well as the optical data storage devices. It is therefore to be understood that within the scope of the appended claims, the invention may be practiced otherwise than as specifically described herein.

What is claimed is:

1. Vibration and contamination reducing apparatus for use with a disk data storage system, said system including a rotating disk storage medium having a concentric recording area on a first side, said apparatus comprising:

an annular control surface, having a center hole therein, disposed substantially parallel to said first side of said rotating disk storage medium and spaced therefrom a substantially small distance to cause air flow therebetween to be substantially laminar, said control surface having an outer edge substantially opposite an outer edge of said rotating disk storage medium;

air delivering means for delivering pressurized air between said control surface and said first side of said rotting disk storage medium, said pressurized air being delivered at an outer edge of said center hole in said control surface; and back pressure means attached to said outer edge of said annular control surface for reducing air flow of said pressurized air as said pressurized air passes said control surface outer edge.

2. The apparatus as defined in claim 1 wherein said air delivering means comprises:

a semi-circular air duct mounted on an opposite side of said control surface from said rotating disk storage medium, said duct being mounted adjacent to said center hole, and having the center of the arc of said duct mounted at a point opposite a slot;

an air inlet hole in said duct opposite said control surface for allowing pressurized air to enter said duct;

means for supplying pressurized air to said air inlet hole; and air outlet means for allowing said pressurized air to pass from said duct into said area between said control surface and said first side of said rotating disk storage medium said air outlet means comprising a plurality of holes in said duct that extend through said control surface into said area between said control surface and said rotating disk storage medium.

3. The apparatus as defined in claim 2 wherein said duct extends approximately 270 degrees around said center hole.

4. The apparatus as defined in claim 2 wherein said control surface is additionally formed to include said duct.

5. The apparatus as defined in claim 1 wherein said back pressure means comprises a flange constructed to curve away from said rotating disk storage medium, then curve back in an opposite direction whereby space is provided for any vortex created as said air flow passes said outer edge of said rotating disk storage medium.

6. The air shroud as defined in claim 1 wherein said slot in said control surface extends radially inward from said control surface outer edge and is sufficiently long to completely expose said recording area of said rotating disk storage medium whereby said recording area is accessible through said slot by a read/write head of said disk data storage system.

7. An air shroud for use with an optical disk data recording system, said system including a rotating disk having a concentric recording area on a first side thereof, said air shroud comprising:

a circular plate having a center hole and an outer edge, mounted in close proximity to said first side of said rotating disk leaving an air space therebetween, said plate being mounted a substantially small distance from said rotating disk to cause air flow in said air space to be substantially laminar;

means for delivering pressurized air into said air space, said air entering near said center center hole in said plate; and back pressure means attached to said outer edge of said circular plate for reducing air flow of said air as said air passes an outer edge of said rotating disk.

8. The air shroud as defined in claim 7 wherein said air delivering means comprises:

an air channel mounted on an opposite side of said circular plate from said rotating disk, said channel being mounted around the periphery of said center hole, and extending around said center hole, except for the area adjacent to a slot;

an air inlet hole in said channel located on a side of said channel which does not contact said plate;

means for supplying pressurized air to said air inlet hole; and air outlet means for allowing air to pass from said channel into said air space said air outlet means comprising a plurality of holes in a side of said channel contacting said plate and extending through said plate into said air space.

9. The air shroud as defined in claim 8 wherein said channel forms a semi-circle extending approximately 270 degrees around the periphery of said center hole and having the center of said semi-circular channel mounted opposite said slot.

10. The air shroud as defined in claim 8 wherein said circular plate is additionally formed to include said channel.

11. The air shroud as defined in claim 7 wherein said back pressure means comprises a flange constructed to curve away from said rotating disk and then curve back in an opposite direction whereby space is provided for any vortex created as said air flow passes said outer edge of said rotating disk.

12. The air shroud as defined in claim 7 wherein said slot extends from an outer edge of said circular plate, said slot being sufficiently long to completely expose said recording area whereby said recording area is accessible through said slot by a read/write head of said disk data storage system.

* * * * *